US012785794B2

(12) United States Patent
Fine et al.

(10) Patent No.: US 12,785,794 B2
(45) Date of Patent: Nov. 3, 2026

(54) IMS ELIGIBILITY FOR AN EU-SAT-EU COMMUNICATION SCHEME

(71) Applicants: THALES DIS FRANCE SAS, Meudon (FR); THALES, Meudon (FR)

(72) Inventors: Jean-Yves Fine, Marseilles (FR); Dorin Panaitopol, Gennevilliers (FR); Mohamed El Jaafari, Toulouse (FR); Flavien Ronteix-Jacquet, Toulouse (FR)

( * ) Notice: Subject to any disclaimer, the term of this patent is extended or adjusted under 35 U.S.C. 154(b) by 370 days.

(21) Appl. No.: 18/409,983

(22) Filed: Jan. 11, 2024

(65) Prior Publication Data

US 2025/0233652 A1 Jul. 17, 2025

(51) Int. Cl.
*H04B 7/185* (2006.01)
*H04L 65/1016* (2022.01)
*H04L 65/1045* (2022.01)

(52) U.S. Cl.
CPC ..... *H04B 7/18521* (2013.01); *H04B 7/18539* (2013.01); *H04L 65/1016* (2013.01); *H04L 65/1045* (2022.05)

(58) Field of Classification Search
CPC ............. H04L 65/1016; H04L 65/1104; H04L 65/1069; H04L 65/1045; H04W 80/10; H04M 15/57; H04M 15/63; H04M 15/8228
See application file for complete search history.

(56) References Cited

U.S. PATENT DOCUMENTS

2018/0139329 A1* 5/2018 Hsu ..................... H04L 65/1104
2023/0035323 A1 2/2023 Jun et al.
2025/0056229 A1* 2/2025 Edge .................. H04B 7/18584

FOREIGN PATENT DOCUMENTS

WO WO-2022177859 A1 * 8/2022 ......... H04L 65/1016

OTHER PUBLICATIONS

International Search Report (PCT/ISA/210) and Written Opinion (PCT/ISA/237) mailed on Mar. 28, 2025 by the European Patent Office as the International Searching Authority for the corresponding International Application pursuant to the PCT N°PCT/EP2025/050222—[17 pages].

(Continued)

*Primary Examiner* — Khalid W Shaheed

(57) ABSTRACT

A method for establishing a communication of the IP multimedia subsystem in local routing mode where user data are routed directly at one or more interconnected satellites, without passing through the ground, between two UE terminals connected to a regenerative satellite of a communication network comprising a satellite constellation. A session control function of the IMS core network interrogates a server linked to the satellite constellation with the information relating to the satellite access networks of the two terminals. The server is able to determine, by verification of an inter-satellite link between the regenerative satellites corresponding to the information relating to the satellite access networks of the two terminals, whether local routing of the user plane without passing through the ground is available to directly connect the two terminals are connected by link.

5 Claims, 4 Drawing Sheets

(56) References Cited

OTHER PUBLICATIONS

"3rd Generation Partnership Project; Technical Specification Group Services and System Aspects; Study on integration of satellite components in the 5G architecture; Phase 3 (Release 19)", 3GPP Standard; Technical Report; 3GPP TR23.700-29, 3RD Generation Partnership Project (3GPP), Mobile Competence Centre, No. V0.2.0, Nov. 24, 2023 (Nov. 24, 2023), pp. 1-19, XP052552853, Retrieved from the Internet: URL:https://ftp.3gpp.org/Specs/archive/23_series/23.700-29/23700-29-020.zipdraft_23700-29-020_rm.docx.

Jean-Yves Fine et al: "New Solution for KI#3: Solution to determine UE-SATs-UE eligibility and enable communication setup", 3GPP Draft; S2-2401807; Type PCR; FS_5GSAT_PH3_ARCH, 3RD Generation Partnership Project (3GPP), Mobile Competence Centre ; 650, Route Des Lucioles ; F-06921 Sophia-Antipolis Cedex ; FRANCE, vol. SA WG2, No. Online; Jan. 22, 2024-Jan. 29, 2024, Jan. 31, 2024 (Jan. 31, 2024), XP052559613, Retrieved from the Internet: URL:https://www.3gpp.org/ftp/tsg_sa/WG2_Arch/TSGS2_160AHE_Electronic_2024-01/Docs/S2-2401807.zipS2-2401807-was-S2-2401077-S_5GSAT_ARCH_Ph3-PCR 23.700-29 Solution for UE-SATs-UE eligibility—r02.docx, [retrieved on Jan. 31, 2024], the whole document.

* cited by examiner

IMS ELIGIBILITY FOR AN EU-SAT-EU COMMUNICATION SCHEME

TECHNICAL FIELD

The invention relates to the domain of satellite communications, in the case of integration of the satellite system into the 5th generation (5G) cellular network, as specified by the 3GPP standardization organization.

More specifically, the invention relates to a method for establishing a communication of the IP multimedia subsystem (IMS) between two terminals (UE, for User Equipment) each having IMS clients within a communication network comprising a network core and a satellite constellation comprising regenerative satellites, the communication being established in "direct UE-satellite-UE" mode, that is, in a mode where the user data are routed directly to the satellite or from several interconnected satellites, without passing through the ground.

The invention also relates to a core network implementing the method according to the invention.

BACKGROUND

The invention relates to the 5th generation (5G) cellular network, as specified by the standardization organization 3GPP, in the case of integration of the satellite system into the cellular network of 5th generation (5G), as specified by the standardization organization 3GPP. More specifically, the organization 3GPP produces standards defining the needs, architecture, and operation of the mobile communication system. The first normative elements in relation to the satellite system, whether it is geostationary, in low orbit or in medium orbit, were defined in 3GPP Release-17, completed in June 2022, and the normative work continues to date in Release 19, to define the systems that will be established in the years to come.

Release 19 introduces the regeneration capacity at the payload of the satellite, that is, the computing capacities necessary for handling communication protocols and implementing all or part of the functionalities of a gNodeB as defined by the 3GPP.

The architecture and procedures inherent in the 5G network are specified in the TS 23.501, TS 23.502 and related standards. Signals enabling session establishment, session management, mobility and security of exchanges between a core network and UE equipment is defined in standard TS 24.501.

The establishment of voice, video, etc. sessions in an IP Multimedia Subsystem (IMS) is defined in the TS 24.229 standard, via the description of the Session Initiation Protocol SIP and Session Description Protocol SDP protocols. Several types of SIP servers referred to as Call/Session Control Functions (CSCF) are used to process SIP signaling in the IMS network. For example, an IMS network has the following three functionalities.

The interrogation control function, Interrogating-CSCF I-CSCF, is the SIP server in charge of administrative functions. Its IP address is published in DNS and it provides comprehensive support for the customer or developer interface Cx/Dx and selects a serving control function S-CSCF based on user and load capabilities.

The serving control function, Serving-CSCF, is the central node for signaling in the network. The S-CSCF uses the protocol known under the term Diameter to communicate with the subscriber databases. It provides a flexible application execution using a standards-based multimedia service control interface (ISC), which allows optional load integration with standard online/offline (Ro/Rf) interfaces.

The proxy control function, Proxy-CSCF (P-CSCF), is the SIP proxy that is the point of contact for the IMS terminals. It is also responsible for call charging and provides comprehensive support for Adaptive Multi-Rate transcoding, Wide Band or not (AMR/AMR-WB).

In the operation of the IMS Network, which is a network providing IP services for different types of access network, the calling terminal can give information on the access network used via the "P-Access-Network-Info" field.

There are solutions for storing information of the access network for the user equipment in the Home Subscriber Subsystem (HSS). In particular, document US20100050234A1 is based on the information (SIP REGISTER) stored when registering the user equipment UE in the IP Multimedia Subsystem IMS.

However, once the communication network includes satellite links with regenerative satellites providing the radio cells, the availability of the support cells of the IMS subsystem is not continuous. Thus, a set of satellites, managed by a satellite control center, will provide 5G mobile telephony coverage and thus serve as an access network, alone or in addition to a terrestrial network, to a core network administered by the mobile telephony operator, which core network will implement the various functions inherent in this network: Security, mobility management, billing, etc The information of the access network typically contains the tracking area (TA) and the identifier of the radio cell serving the terminal.

The registration in the IMS subsystem can be done for long periods, and thus the identifiers of the access network during the recording have every chance of no longer being valid during the evaluation of the eligibility for a UE-Sat(s)-UE direct local communication, since the radio cell identifier is associated with a gNodeB function which is itself associated with a given satellite.

Thus, the values stored according to the prior art, in particular the content for the P-Access-Network-Info field, are not representative of the serving cell(s) at any time.

Today, there is a need for an efficient and simple solution to allow the use of the satellite network for the IP multimedia subsystem by taking into account the evolution of the availability of the satellite network.

SUMMARY

The present invention aims to provide a real-time solution for implementing local routing using a satellite system.

The present invention relates to a method for establishing a communication of the IP multimedia subsystem IMS between two UE terminals each having IMS clients within a communication network comprising a core network and a satellite constellation comprising regenerative satellites, the communication being established in a mode where user data are routed directly at one or more interconnected satellites, without passing through the ground, the method comprising the following steps integrated in real time in a session initiation protocol SIP as predefined:

- for the calling terminal connected to a regenerative satellite, via its IMS client, inserting information relating to its satellite sound access network in a message according to the session initiation protocol SIP,
- for the called terminal connected to a regenerative satellite, via its IMS client, inserting information relating to its satellite sound access network in a message according to the session initiation protocol SIP, for a session control function of the core network, retrieving the information related to the satellite access networks of the two terminals, for the session control function of the core network, interrogating a server linked to the satellite constellation able to determine, based on the information relating to the satellite access networks of the two terminals, if local routing of the user plane without passing through the ground is available to connect the two terminals directly, for the server linked to the constellation, verifying that the regenerative satellites corresponding to the information relating to the satellite access networks of the two terminals are connected by inter-satellite link ISL, for the session control function of the core network, transmitting the IP addresses of the two terminals to a session management function SMF for configuration of the local routing, for the session management function, configuring the local routing and implementing the communication in local routing mode where user data are routed between the two terminals directly at one or more interconnected satellites, without passing through the ground.

The invention thus makes it possible to determine, in the case of IP Multimedia Subsystem (IMS) services, that two terminals are indeed served by one or more connected satellites and are therefore eligible for UE-Sat(s)-UE communication.

The present invention uses SIP-supported information to interrogate a service of the satellite system and to determine the eligibility of two terminals for UE-Sat(s)-UE local routing communication.

The invention uses information in real time that is provided in the P-Access-Network-Info field by the two terminals. This information is used by a server of the IMS core network to interrogate a service establishing whether the two terminals are served by the same satellite or two satellites linked via Inter-Satellite Link (ISL). In this case, routing between the two terminals is configured by a serving function S-CSCF via the transmission of the IP addresses to a Session Management Function (SMF). The implementation of this service is configurable for the operator of the constellation of satellites depending on the desired use of the regenerative satellites.

The advantage of the invention is thus to determine, in real time, the Satellites/gNodeB and serving cells for the two terminals and as a result to be able to implement the local routing functionality.

The invention can be deployed on all 5th-generation networks, for example having possible access by satellite network and which would wish to integrate the UE-Sat(s)-UE communication functionality. The invention can be implemented once the satellites are regenerative provide the radio cells, in other words they have all or part of the functionalities of a gNodeB and they are therefore used as a radio access network by the concerned terminals.

In one advantageous embodiment, the information relating to the access networks is inserted into a P-Access-Network-Info field as predefined in the session initiation protocol SIP.

The use of this predefined field in the standard is optimal for a very simple implementation of the invention.

According to a first embodiment, the information relating to the access network of the calling terminal is inserted into a communication invitation message as predefined in the session initiation protocol SIP and the information relating to the access network of the called terminal is inserted into the ringing message for setting up the communication as predefined in the session initiation protocol SIP.

This embodiment allows the calling terminal to signal, in real time, the characteristics of its connection with the satellite network and thus to optimize the taking into account of these characteristics to determine availability of the inter-satellite links enabling local routing by UE-Sat-UE communication.

According to a second embodiment, the information relating to the access network of the called terminal is inserted into the established ringing message of the communication as predefined in the session initiation protocol SIP and the information relating to the access network of the calling terminal is inserted into an acknowledge of receipt message for a communication agreement as predefined in the session initiation protocol SIP.

In this embodiment, it is the called terminal that sends the characteristics of its connection to the satellite network first. The calling terminal then acknowledges receipt of the call and sends the characteristics of its connection to the satellite network only at that moment.

The invention also relates to a core network of an IP multimedia communication network IMS connected to a 5G network comprising a satellite constellation with regenerative satellites providing the radio cells and a 5G core network, the IP multimedia core network IMS comprising at least one session control function and a session management function and being configured to establish communication of the IP multimedia subsystem IMS between two UE terminals each having IMS clients within the communication network, the communication being in local routing mode where user data are routed directly at one or more interconnected satellites, without passing through the ground, the session control function of the IMS core network being configured to receive information in real time relating to the satellite access networks of the calling and called terminals, both connected to a regenerative satellite of the constellation, in messages according to the session initiation protocol SIP as predefined, and to interrogate a server linked to the satellite constellation capable of determining, based on the information relating to the satellite access networks of the two terminals, whether a local routing of the user plane without passing through the ground is available to connect the two terminals directly, this server verifying that the regenerative satellites corresponding to the information relating to the satellite access networks of the two terminals are connected by inter-satellite link ISL, the session control function of the core network further being configured to transmit the IP addresses of the two terminals to the session management function SMF for configuration of the local routing and implementation of the communication in local routing mode where user data are routed between the two terminals directly at one or more interconnected satellites, without passing through the ground.

Such an IMS core network implements the UE-Sat-UE local routing communication once the satellites to which the terminals are connected are eligible for a local direct UE-Sat-UE link.

It is noted here that the exchange of multimedia IP user data on the direct local link can be subject to additional conditions and/or restrictions such as a restriction on the type of exchangeable user data on the direct link, on the type of terminal or the nature of the user's subscription.

The IMS core network according to the invention can also have all the features and behaviors/configurations as claimed for the method according to the invention and these features, behaviors, configurations may later be claimed as such.

For the performance of the preceding objectives and related objectives, several embodiments comprise the features described below in a complete and detailed manner.

BRIEF DESCRIPTION OF THE DRAWINGS

The following description and the accompanying drawings illustrate in detail some illustrative aspects and represent only a few of the various ways in which the principles of the invention can be employed. Other advantages and features will become apparent from the following detailed description, when considered in conjunction with the drawings, and the disclosed embodiments are intended to include all these aspects and equivalents thereof.

DETAILED DESCRIPTION

Figure 1:
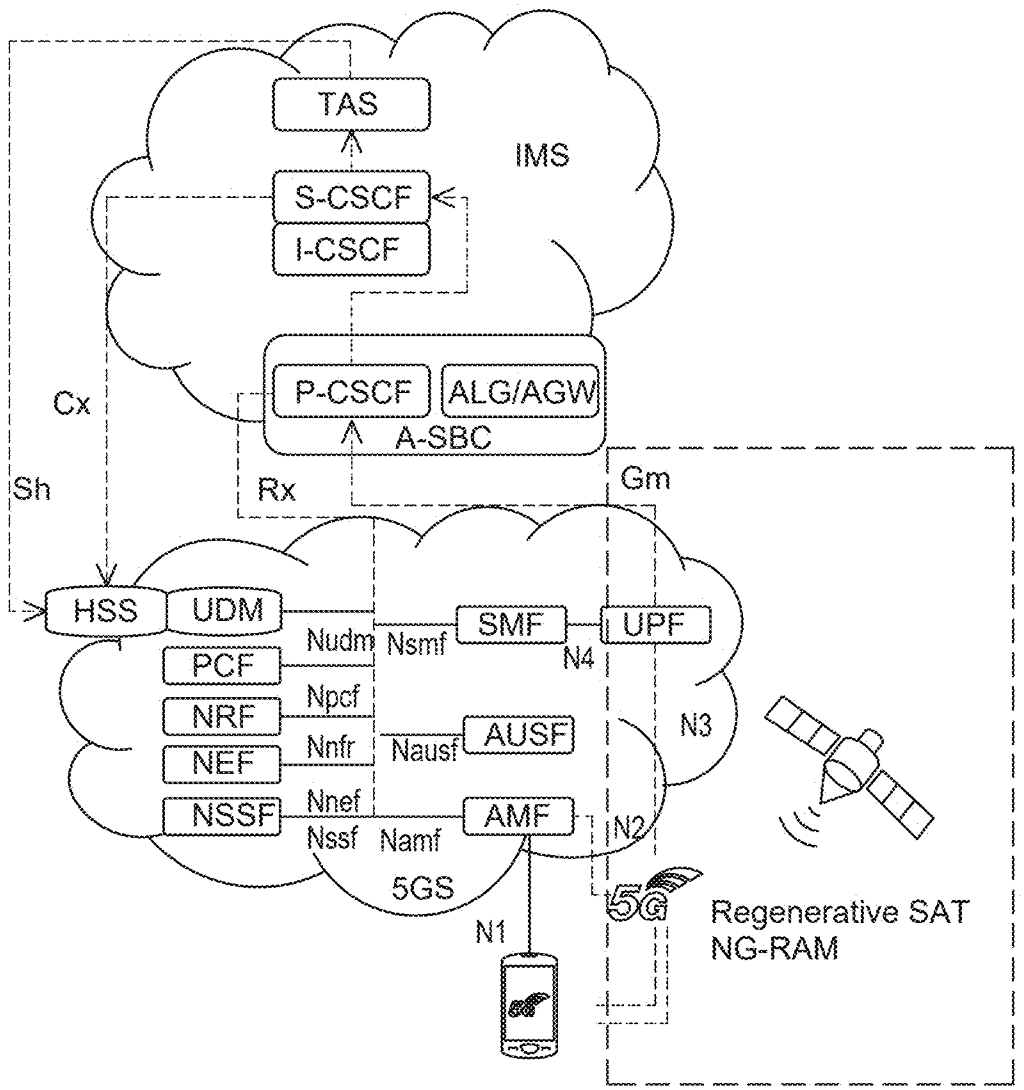
FIG. 1 schematically shows the overall architecture of the 5th generation core network and IMS layers comprising non-terrestrial cells.

For a more complete understanding of the invention, this will now be described in detail with reference to the appended figures. The detailed description will illustrate and describe what is considered to be a preferred embodiment of the invention. It is of course understood that various modifications and changes of shape or detail could easily be made without departing from the scope of the invention. It is therefore provided that the invention is not limited to the exact shape and details shown and described herein, nor to anything less than the entirety of the invention disclosed herein and claimed below. The same elements have been designated by the same references in the various drawings. For clarity's sake, only the elements and the steps which are useful to understanding the present invention have been shown in the drawings and will be described.

FIG. 1 shows the architecture hypotheses of the Rel-19 3GPP, where satellite access with a regenerative payload allows 5G core access to provide an IMS service as in Voice over New Radio (VoNR), or Video over New Radio (ViNR).

Figure 2:
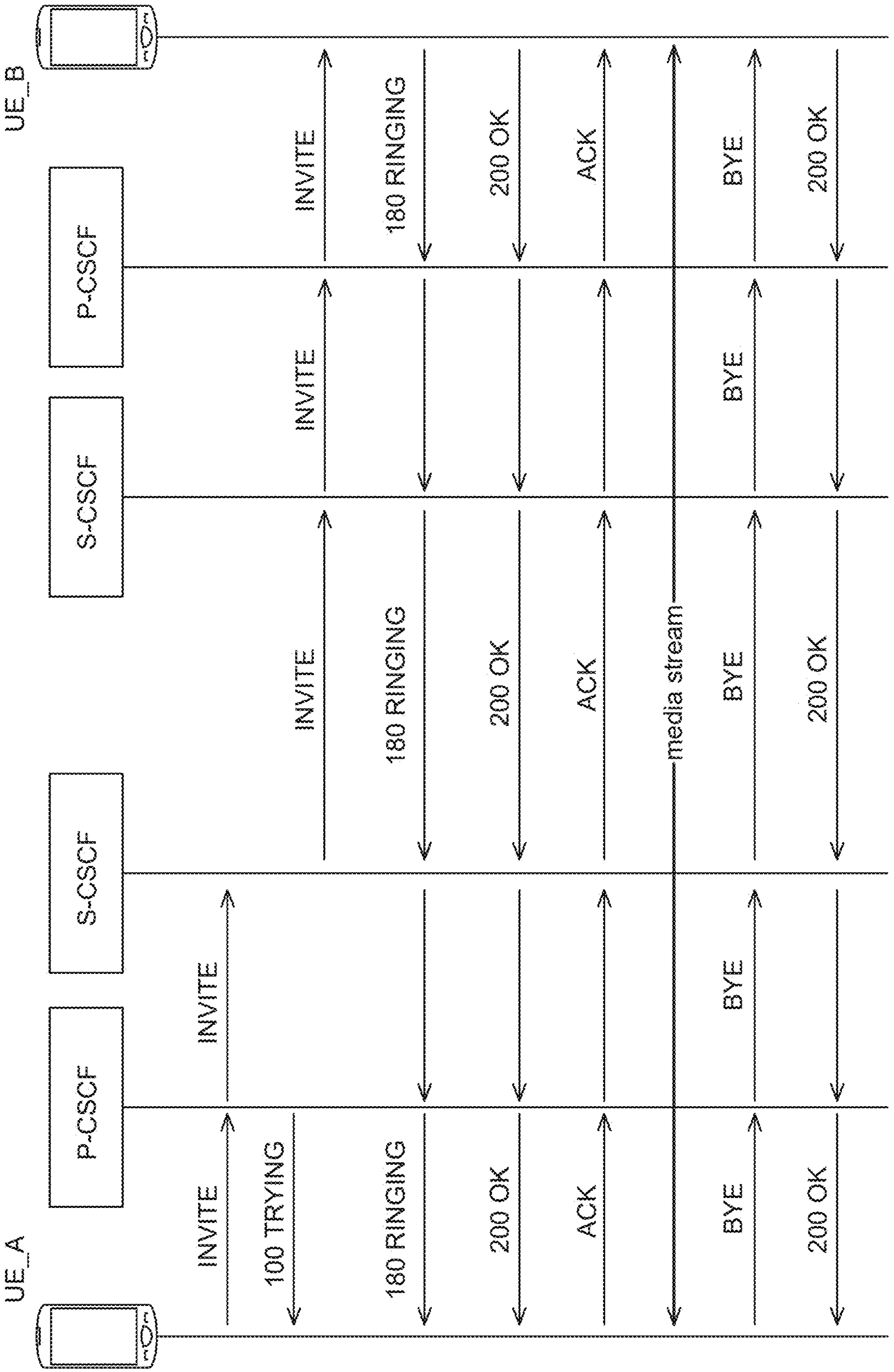
FIG. 2 schematically shows the SIP signaling stream between 2 IMS clients in a general case.

FIG. 2 shows the SIP signaling stream between two IMS clients in a general case where the two terminals do not have the same serving function S-CSCF. A first terminal UE_A sends an invitation INVITE for communication to a second terminal UE_B to the proxy function P-CSCF, which transfers it to the serving function S-CSCF of the first terminal. Ringing information RINGING on the terminal UE_B is returned to the terminal UE_A until the user of the terminal UE_B responds. In this case, OK to establish communication information 200 is returned to the terminal UE_A, which acknowledges receipt ACK in return. The media stream, depicted by a bold double arrow, is then established. Then, the terminal which is hung up first, here UE_A, sends end-of-communication information BYE that the second terminal consents to by an OK information 200. In the case where the two terminals are subscribers to the same IMS network, i.e., outside roaming, which is the case envisaged by the 3GPP study in release 19, there is only one S-CSCF.

When a satellite network is implemented, for various reasons, such as for example latency optimization during a communication or else saving resources on the link between the satellite and the ground gateway, it is possible to connect two user terminals UE by directly switching the communication data in the satellite SAT, without returning to the ground, provided that the two terminals are served by the same satellite or by a set of satellites connected via inter-satellite links (ISLs). Reference is then made to UE-Sat(s)-UE communication.

Figure 3:
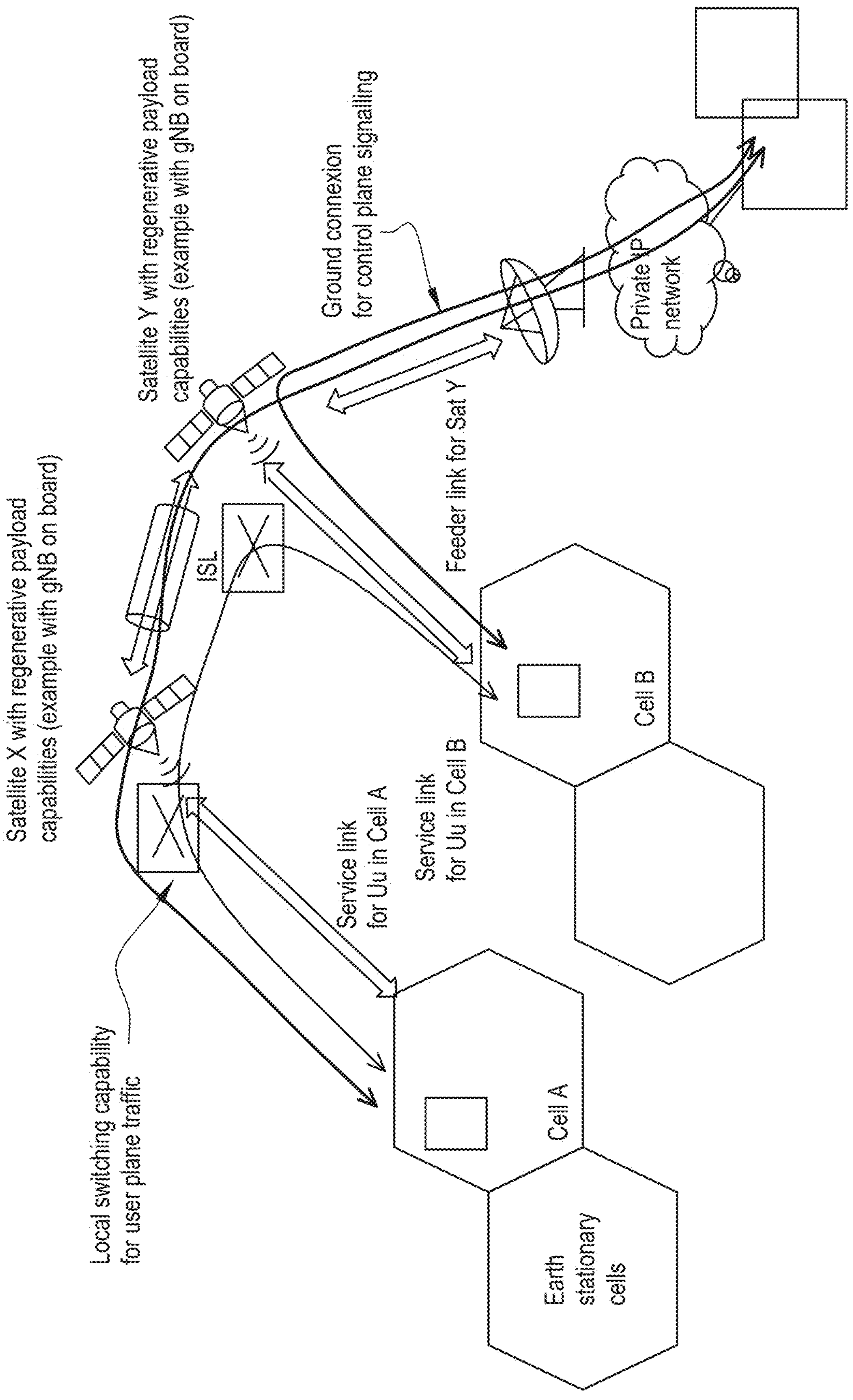
FIG. 3 schematically shows the basic concept of the UE-SAT-UE communications using cells integrated into different low-orbit satellites and connected by Inter-Satellite Links (ISL)

Thus, 3GPP Release 19 introduces the notion of regenerative satellite and the resulting possibility of having a scheme of the UE-Sat(s)-UE type according to FIG. 3, explained in study document TR 23.700-29 currently being developed, "Study on Integration of Satellites components in the 5G architecture," Phase 3, in English.

FIG. 3 shows the basic concept of the UE-SAT-UE communications using cells integrated into different orbit satellites and connected by Inter-Satellite Links (ISL). Once the satellites connected to the terminals are connected via an inter-satellite link ISL as defined in the present or future standard, it is possible to perform local routing of the data exchanged between the terminals, i.e. without going through the ground.

Figure 4:
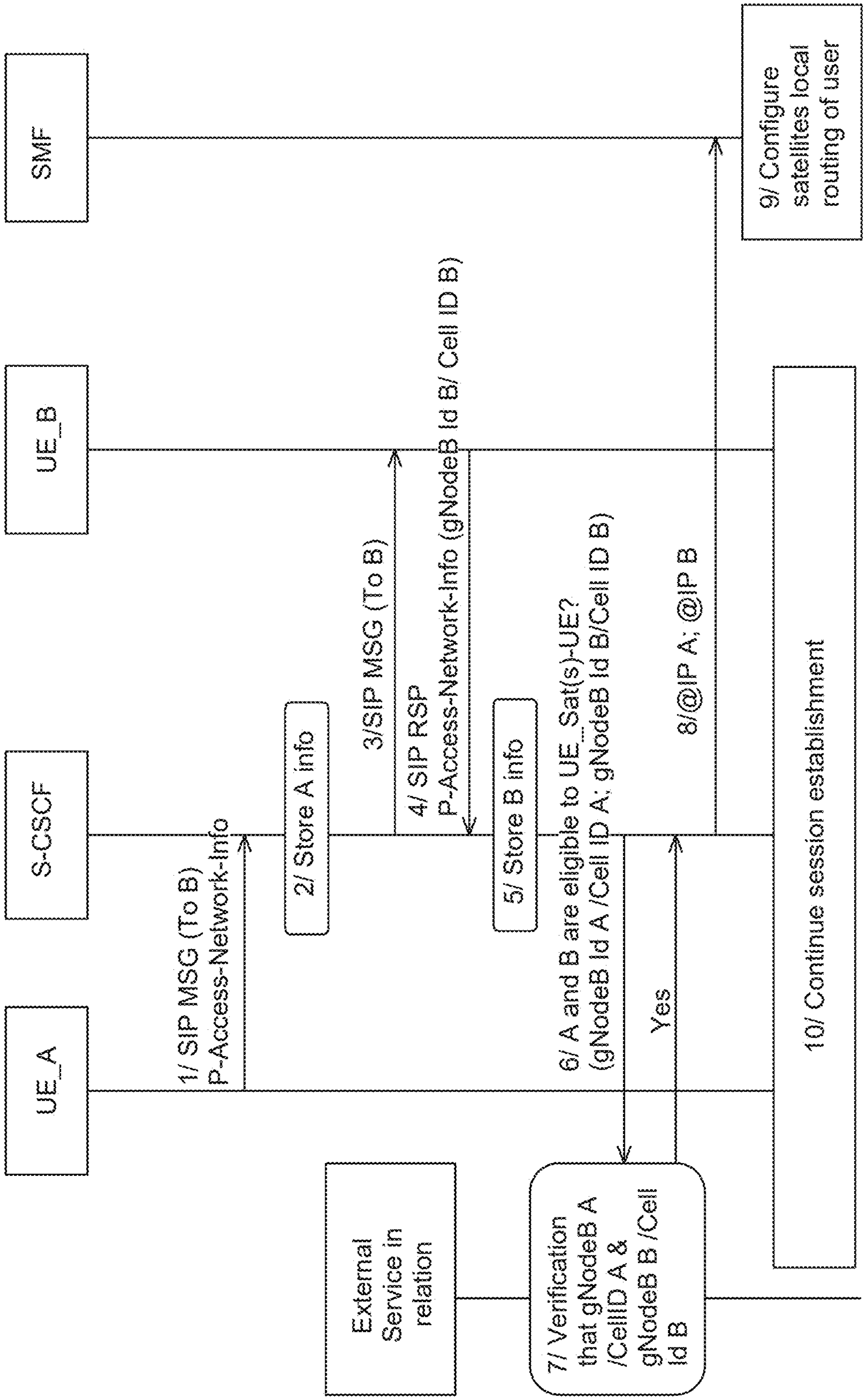
FIG. 4 is a time diagram showing a method according to the invention.

FIG. 4 schematically shows the exchanges between the entities shown in FIG. 3 when they are implementing a method according to the invention. This is an illustrative example of implementation of the method according to the invention in a case where a single S-CSCF function is present, i.e. in a case where the terminals are not in a roaming situation.

In a step E1, a calling terminal UE_A, via its IMS client, gives information to a field P_Network_Info in a message according to the session initiation protocol SIP, here an INVITE message for example, when it proposes communication to a terminal called UE_B. The P_Network_Info field is populated with information about the access networks of the terminal UE_A. This is typically information relating to the gNodeB carried by a satellite SA and to a serving cell with which the terminal UE_A is connected. This field is advantageously a P-Access-Network-Info field as defined elsewhere in the standard.

It is recalled here that document RFC7976 stipulates that this "P-Access-Network-Info" header field can appear in all SIP protocols and the non-100 responses, with the exception of the cancellation protocols (CANCEL methods, CANCEL responses) and the acknowledgment protocols (ACK methods) triggered by the non-2xx responses as defined in the standard.

The P-Access-Network-Info field will thus provide information on the satellite and the gNodeB that it carries, as well as on the serving cell. Advantageously, the P-Access-Network-Info field is positioned with an access-type sub-field equal to "3GPP-NR-SAT".

In this case, a "utran-cell-id-3gpp" parameter corresponds to the concatenation of the Mobile Country Code MCC (3 decimal digits), Mobile Network Code MNC (2 or 3 decimal digits depending on MCC value), Tracking Area TAC (6 hexadecimal digits), NR Cell Identity (NCI) (9 hexadecimal digits), and optionally, PLMN ID and Network identifier NID (11 hexadecimal digits) as specified in document TS 23.003 of the 3GPP.

The "utran-cell-id-3gpp" parameter is encoded in ASCII as defined in document RFC 20 also belonging to the standard. In 5G NR, the NCI corresponds to 36 bits and identifies a gNodeB and a local cell.

The P-Access-Network-Info field thus has all the data necessary for the tracking of the method according to the invention.

Advantageously, in a step E1' an IMS session control function of the core network, typically the serving session control function S_CSCF, stores the information contained in the field P-Access-Network-Info. The call invitation message is then transmitted to a terminal called UE_B in a step E2. In a step E3, the called terminal UE_B sends a return message according to the SIP protocol and in turn inserts the information from gNodeB and Cell concerning it. Thus, the terminal called UE_B, via its IMS client, in turn populates the field P-Access-Network-Info when it responds to the prompt in one of the call placement messages, for example the RINGING message as shown in FIG. 2.

Here again, the IMS core network, here the session control serving function S-CSCF, recovers the information from the called terminal UE_B. Advantageously, it also stores this information in a step E3'.

The core network, here the S-CSCF (Serving Call Session Control Function) function, once in possession of the gNodeB and serving cell information for both terminals in real time, will interrogate a server linked to the constellation to determine whether the two terminals can be directly connected with routing of the user plane without passing through the ground.

Thus, in a step E4, the IMS core network, in this case the session control serving function S-CSCF, interrogates an external service ES in connection with the satellite constellation. To this end, the network core sends to the external service the information relating to the satellite access networks of the two terminals. In a step E5, the external service ES checks that the two cells/gNodeB carried by the two satellites SAT1 and SAT2 supporting the accesses of the two terminals UE_A and UE_B are connected by inter-satellite link ISL at the present instant. The service ES will thus confirm or invalidate that it is possible to implement a communication of the UE-Sat(s)-UE type between the two terminals, by verifying that the satellites are indeed interconnected via ISL.

If this is the case, the S-CSCF function is informed in a step E5'. Advantageously, in a step E6, the S-CSCF function then sends a Session Management Function (SMF) the IP addresses of the two terminals for configuration of the local routing.

This corresponds to the case where an SMF function handles the IP routing and the configuration of the User Plane Function (UPF) in a step E7.

It is then possible to continue the call establishment in a UE-Sat-UE communication mode, that is, local routing where user data are routed directly at one or more interconnected satellites, without passing through the ground, in a step E8.

It is noted here that the external service in relation to a satellite operator can be implemented in a Policy Control Function (PCF) or Policy and Charging Rules Function (PCRF) and/or in a Unified Data Management (UDM) server, AUthentication Server Function (AUSF), Home Subscriber Server (HSS) and/or in a Proxy-Call Session Control Function (P-CSCF) and/or IP Multimedia Subsystem-Application Server (IMS-AS).

As noted above, according to the implementation of the invention, different pairs of session initiation protocol SIP messages can be used. Thus, it is possible to use the currently predefined INVITE & RINGING message pair, or the currently predefined RINGING & ACK message pair, or other possible combinations between the SIP messages to transmit the P-Access-Network-Info information. It is thus noted that the calling terminal can be the first to transmit the proxy access information or can also transmit this information subsequently to a first response from a called terminal. It is also noted here that the above description is carried out for communication between two terminals, but that the invention applies equally well to communication for a group of users, typically communication for a group of more than two users.

It is also noted that the invention can be implemented using the same core network functions, typically the same proxy and serving functions P-CSCF/S-CSCF, or different P-CSCF/S-CSCF functions for each of the users.

Finally, the invention implemented by IMS core network functions can be managed by the proxy function P-CSCF and/or by the serving function S-CSCF and/or by the interrogation function I-CSCF or by a combination of several functions.

In the detailed description above, reference is made to the appended drawings which show specific embodiments wherein the invention can be implemented. These embodiments are described in a sufficiently detailed manner to allow a person skilled in the art to put the invention into practice. The detailed description above should therefore not be taken in a limiting sense, and the scope of the present invention is defined only by the appended claims, interpreted appropriately.

The invention claimed is:

1. A method for establishing a communication of the IP multimedia subsystem (IMS) between two user equipment (UE) terminals each having IMS clients within a communication network comprising a core network and a satellite constellation comprising regenerative satellites providing the radio cells, the communication established in a local routing mode where user data are routed directly at one or more interconnected satellites, without passing through the ground, the method comprising the following steps integrated in real time in a session initiation protocol SIP as predefined:

- for the calling terminal connected to a regenerative satellite, via its IMS client, dynamically inserting information relating to its current satellite access network into a message according to the SIP session initiation protocol during session establishment,
- for the called terminal connected to a regenerative satellite, via its IMS client, dynamically inserting information relating to its current satellite access network into a message according to the SIP session initiation protocol during session establishment,
- for a session control function of the core network, actively retrieving the information related to the satellite access networks of the two terminals in real time,
- for the session control function of the core network, interrogating a server linked to the satellite constellation able to determine, based on the information relating to the satellite access networks of the two terminals, if local routing of the user plan without passing through the ground is available to connect the two terminals directly at the current time,
- for the server linked to the constellation, verifying in real time that the regenerative satellites corresponding to the information relating to the satellite access networks of the two terminals are connected by inter-satellite link (ISL),
- for the session control function of the core network, transmitting the IP addresses of the two terminals to a session management function (SMF) for configuration of the local routing based on the real-time verification,
- for the session management function, configuring the local routing and implementing the communication in local routing mode where user data are routed directly at one or more interconnected satellites, without passing through the ground, between the two terminals without delay for store-and-forward operations.

2. The method according to claim 1, wherein the information relating to the access networks is inserted into a P-Access-Network-Info field as predefined in the session initiation protocol SIP.

3. The method according to claim 1, wherein the information relating to the access network of the calling terminal is inserted into a communication invitation message as predefined in the session initiation protocol SIP and the information relating to the proxy access of the called terminal is inserted into the ringing message for setting up the communication as predefined in the session initiation protocol SIP.

4. The method according to claim 1, wherein the information relating to the access network of the called terminal is inserted into the established ringing message of the communication as predefined in the session initiation protocol SIP and the information relating to the access network of the calling terminal is inserted into an acknowledge of receipt message for a communication agreement as predefined in the session initiation protocol SIP.

5. A core network of an IP multimedia communication network (IMS) connected to a 5G network comprising a satellite constellation with regenerative satellites providing the radio cells and a 5G core network, the IP multimedia core network IMS comprising at least one session control function and a session management function and configured to establish communication of the IP multimedia subsystem IMS between two user equipment (UE) terminals each having IMS clients within the communication network, the communication in local routing mode where user data are routed directly at one or more interconnected satellites, without passing through the ground, wherein the calling terminal is configured to dynamically insert, via its IMS client, information relating to a current satellite access network of the calling terminal into a first SIP message during session establishment, wherein the called terminal is configured to dynamically insert, via its IMS client, information relating to a current satellite access network of the called terminal into a second SIP message during session establishment, the session control function of the IMS core network configured to retrieve, in real time from the first SIP message and the second SIP message, the information relating to the current satellite access networks of the calling and called terminals, both connected to a regenerative satellite of the constellation, and to interrogate a server linked to the satellite constellation capable of determining, based on the information relating to the current satellite access networks of the two terminals, whether a local routing of the user plane without passing through the ground is available to connect the two terminals directly, this server configured to verify, at the current instant, that the regenerative satellites corresponding to the information relating to the satellite access networks of the two terminals are connected by inter-satellite link (ISL), the session control function of the core network further configured to transmit the IP addresses of the two terminals to the session management function (SMF) for configuration of the local routing and implementation of the communication in local routing mode where user data are routed between the two terminals directly at one or more interconnected satellites, without passing through the ground.

* * * * *